March 1, 1927.
M. DOUJAK
1,619,709
AUTOMOBILE SAFETY ATTACHMENT
Filed July 26, 1926
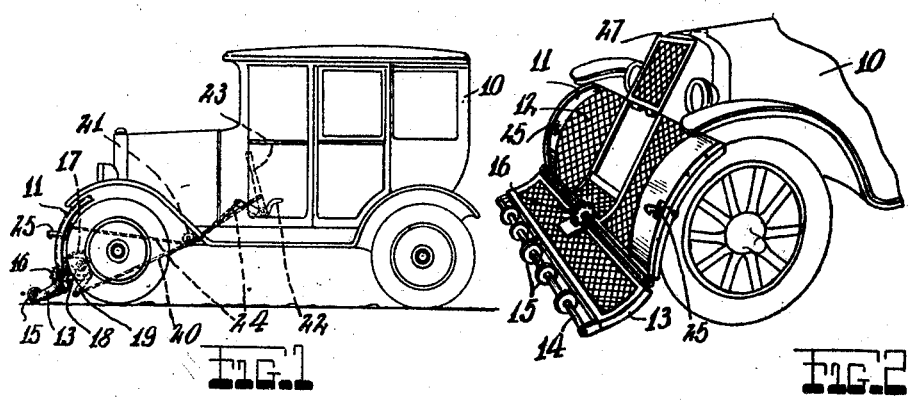
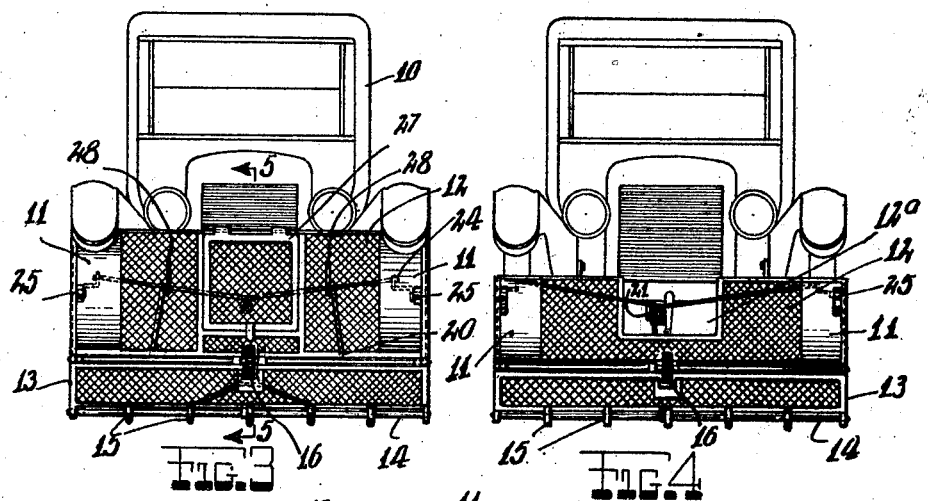
INVENTOR
Maria Doujak
BY
ATTORNEY Patented Mar. 1, 1927.

1,619,709

UNITED STATES PATENT OFFICE.

MARIA DOUJAK, OF NEW YORK, N. Y.

AUTOMOBILE SAFETY ATTACHMENT.

Application filed July 26, 1926. Serial No. 124,903.

This invention relates generally to safety devices, and has more particular reference to a novel type of fender for automobiles or the like.

The invention has for an object the provision of an improved fender which is efficient in action, and which can be manufactured and sold at a low cost.

Another object of the invention is to provide means for operating said fender, said means being located in a position convenient to the driver of the vehicle, and suitably connected to the fender.

For further comprehension of the invention, and of the objects and advantages thereof, reference will be had to the following description and accompanying drawing, and to the appended claims in which the various novel features of the invention are more particularly set forth.

Referring to the drawing forming a material part of this disclosure:—

Fig. 1 is a side elevational view of a motor vehicle with the invention device applied thereto.

Fig. 2 is an enlarged fragmentary perspective front view thereof.

Fig. 3 is a front view of the vehicle and the invention device.

Fig. 4 is a front view of the vehicle with a slightly modified form of the invention device.

Fig. 5 is a fragmentary sectional view taken on the line 5—5 of Fig. 3.

Fig. 6 is an enlarged sectional view taken on the line 6—6 of Fig. 3.

Fig. 7 is an enlarged fragmentary sectional view of the latch.

Fig. 8 is a similar view to Fig. 4, showing the fender in raised position.

The reference numeral 10 indicates a vehicle which is provided with frame members 11 supporting a screen 12. A fender 13 is pivotally supported to the frame members 11, and a rod 14 is secured to the front of the fender 13, while a number of rollers 15 are rotatably mounted on the rod.

Co-axially mounted and fixed to the pivotal support of fender 13, is the gear 16 which meshes with a segmental gear 17 pivotally supported by bracket 18 depending from frame members 11. Lever 19 is fixed to segmental gear 17, and the bottom of lever 19 has cord 20 attached, which cord abuts against idler wheel 21, and the end of the cord is attached to hand lever 23 pivotally secured to the floor of the vehicle 10. The foot pedal 22 is also pivoted to the floor of the vehicle, and has connected thereto cord 24, guided over idler pulley 21, and connected to the rear ends of latches 25 pivotal in frame members 11. Coil springs 26 normally urge latches downwardly.

The screen member 12 is provided with a hingeably mounted door 27 to permit a cranking of the vehicle if necessary, or the screen member 12 may be formed with an opening 12$^a$ for this purpose, as shown in Fig. 4.

A pair of supports 28 aid in the guiding of the cords 24. Normally the fender 13 is in a raised position, and thus held by latches 25 as shown in Fig. 6. Should the vehicle operator have cause to lower the fender to the position as shown in the Figs. 1 to 5 of the drawing, it is only necessary to step on foot pedal 22, which pulls cord 24, and causes the latch 25 to be raised releasing the said fender, which falls downwardly due to gravity. To raise the fender the operator draws backwards lever 23 which draws cord 20 causing the gears 17 and 16 to raise the said fender.

The fender may be bent due to the rough treatment it receives when it is in the lowered position and the vehicle is in motion. In order for the latches 25 to engage the fender thereafter, it may be necessary for the latch to be longer as indicated in dotted lines in Fig. 6. This is accomplished by the latch 25$^a$ being slidable in a gripping member 25$^b$, both latch and member being formed with teeth 25$^c$ to engage each other in different adjusted positions. The gripping member 25$^b$ is formed with a locking screw 25$^d$.

While I have illustrated and described my invention with some degree of particularity, I realize that in practice various alterations therein may be made, I, therefore, reserve the right and privilege of changing the form of the details of construction or otherwise altering the arrangement of the correlated parts without departing from the spirit or the scope of the appended claims.

Having thus described my invention, what I claim as new and desire to secure by United States Letters Patent is:—

1. A device of the class described, comprising frame members, a screen between said frame members, a fender pivotally connected to said frame members, rollers rotatably fastened to said fender, a segmental gear meshing with said gear, said segmental gear being rotatably supported by brackets depending from said frame members, a lever depending from said segmental gear, a cord attached at one end to said lever, a hand lever pivotally mounted to the floor of the vehicle, the free end of said cord being attached to said hand lever, a latch device pivotally connected to said frame members, a cord attached to said latch device, a foot pedal pivotally mounted to the floor of the vehicle, and the free end of said second mentioned cord being attached to said foot pedal.

2. A device of the class described, comprising frame members, a screen between said frame members, a fender pivotally connected to said frame members, rollers rotatably fastened to said fender, a gear co-axially fixed to the pivotal connection of said fender, a segmental gear meshing with said gear, said segmental gear being rotatably supported by brackets depending from said frame members, a lever depending from said segmental gear, a cord attached at one end to said lever, a hand lever pivotally mounted to the floor of the vehicle, the free end of said cord being attached to said hand lever, a latch device pivotally connected to said frame members, a cord attached to said latch device, a foot pedal pivotally mounted to the floor of the vehicle, and the free end of said second mentioned cord being attached to said foot pedal and an idler roller guiding said cords.

3. A device of the class described, used in conjunction with a vehicle comprising frame members, a screen between said frame members, a fender pivotally connected to said frame members, rollers rotatably fastened to said fender, a gear co-axially fixed to the pivotal connection of said fender, a segmental gear meshing with said gear, said segmental gear being rotatably supported by brackets depending from said frame members, a lever depending from said segmental gear, a cord attached at one end to said lever, a hand lever pivotally mounted to the floor of the vehicle, the free end of said cord being attached to said hand lever, a latch device pivotally connected to said frame members, a cord attached to said latch device, a foot pedal pivotally mounted to the floor of said vehicle, and the free end of said second mentioned cord being attached to said foot pedal.

In testimony whereof I have affixed my signature.

MARIA DOUJAK.